United States Patent
Hou et al.

[11] Patent Number: 5,839,823
[45] Date of Patent: Nov. 24, 1998

[54] BACK-COUPLED ILLUMINATION SYSTEM WITH LIGHT RECYCLING

[75] Inventors: Janpu Hou, Somerset; Waltraud Rosalie Unger, Glen Rock; Jerry Wayne Kuper, Martinsville, all of N.J.

[73] Assignee: AlliedSignal Inc., Morris Township, N.J.

[21] Appl. No.: 622,131

[22] Filed: Mar. 26, 1996

[51] Int. Cl.$^6$ ........................................ F21V 5/00
[52] U.S. Cl. ........................ 362/327; 362/268; 362/299; 362/309; 362/331; 362/332; 362/333; 362/339; 362/342
[58] Field of Search ............................ 349/57, 62, 64, 349/95, 63; 359/619, 625, 638, 639, 640; 362/299, 300, 303, 308, 309, 327, 328, 332–334, 336–340, 342, 343, 346, 268

[56] References Cited

U.S. PATENT DOCUMENTS

| | | | |
|---|---|---|---|
| 1,442,463 | 1/1923 | Bowman | 362/342 |
| 2,398,624 | 4/1946 | Decker | 362/342 |
| 3,351,753 | 11/1967 | Berger | 362/327 |
| 4,550,979 | 11/1985 | Meier | 359/619 |
| 4,816,968 | 3/1989 | Yamada et al. | 362/309 |
| 5,220,462 | 6/1993 | Feldman, Jr. | 359/619 |
| 5,396,350 | 3/1995 | Beeson et al. | 349/65 |
| 5,428,468 | 6/1995 | Zimmerman et al. | 362/31 |
| 5,481,385 | 1/1996 | Zimerman et al. | 349/62 |
| 5,598,281 | 1/1997 | Zimerman et al. | 349/62 |

FOREIGN PATENT DOCUMENTS

| | | |
|---|---|---|
| 1 266 129 | 10/1969 | European Pat. Off. . |
| WO 94/12367 | 6/1994 | European Pat. Off. . |
| WO 95/31672 | 11/1995 | European Pat. Off. . |
| 42 30 907 A1 | 3/1994 | Germany . |

OTHER PUBLICATIONS

DE 42 30 907 A1 (English Abstract) 1994. (No month).
PCT/US97/04621 Mar. 1997.
P1.4–1 LCD Multi–Panel Display, M. Fukuhara, Y. Ligahama, T. Suzuki, H. Yamaguchi—Fujitsu Ltd., Kawasaki, Japan—ASIA Display 1995 (No month).

*Primary Examiner*—Alan Cariaso
*Attorney, Agent, or Firm*—John A. Squires; Colleen D. Szuch

[57] ABSTRACT

The light output of a back-coupled illumination system is improved by recycling reflected and misdirected light rays. A reflector at the light source and an array of microprisms having reflective elements therebetween efficiently redirect errant light rays to increase the total available light output and improve efficiency. Both specular and diffuse reflective materials may be used in combination to enhance light output.

8 Claims, 14 Drawing Sheets

BACK-COUPLED ILLUMINATION SYSTEM WITH LIGHT RECYCLING

BACKGROUND OF THE INVENTION

Currently available illumination systems for direct lighting and other applications suffer from losses due to absorption and radiation of light in undesired directions. If the light rays lost through absorption or radiation in undesired directions could be captured and utilized, the usable output of the light source could be increased. An illumination system that could accomplish this would be highly desirable. This invention achieves this and other goals by redirecting and recycling light that otherwise would be lost.

BRIEF DESCRIPTION OF THE DRAWINGS

The invention will be more fully understood and further advantages will become apparent when reference is made to the following detailed description of the invention and the accompanying drawings in which.

DESCRIPTION OF THE INVENTION

The present invention is directed to an illumination system comprising (a) a light source and (b) a light-directing assembly in close proximity to the light source and comprising (i) at least one microprism, wherein the microprism comprises an input surface that admits light radiating from the light source, an output surface distal from and parallel to the input surface, and at least one sidewall disposed between and contiguous with the input and output surfaces and forming an obtuse tilt angle with respect to the input surface and further positioned for effecting total reflection of the light rays received by the input surface, and (ii) at least one blocking means for blocking the passage of light through the sidewall.

Figure 1:
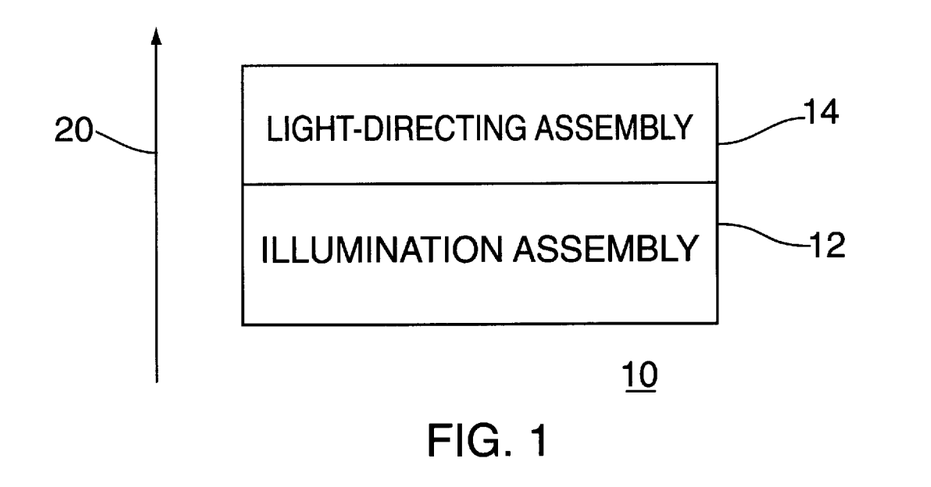
FIG. 1 is a conceptual schematic block diagram of illumination system.

A conceptual representation of the invention is an illumination system 10 in the schematic block diagram of FIG. 1. The illumination system 10 is divided into two subassemblies: an illumination assembly 12 and a light-directing assembly 14. The arrow 20 indicates the intended direction of travel of the light waves from the illumination source 12, through the light-directing assembly 14, and to the intended object (not shown). It should be appreciated that this drawing is merely a schematic representation of the structure and is not intended to convey actual or relative dimensions of the system's components or their physical arrangement.

Figure 2:
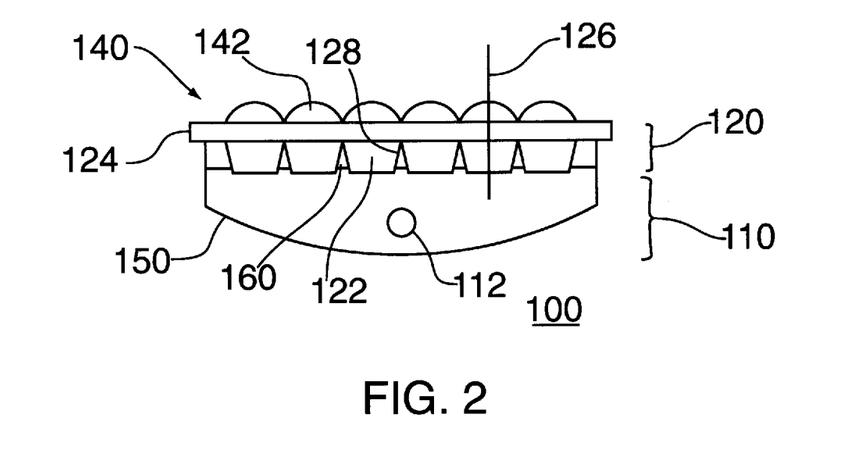
FIG. 2 is a schematic cross-sectional diagram of one embodiment of the illumination system.

A specific embodiment 100 of the illumination system is shown in FIG. 2. The system 100 has an illumination assembly 110 and a light-directing assembly 120 of at least one microprism 122 optionally carried on one side of a base wall 124. The light-directing assembly 120 may optionally have a lens or lens array 140 of individual lenses 142 on the other side of the base wall 124 to control the angular distribution of the light output of the illumination system 100.

The Illumination Assembly

The illumination assembly 110 has a light source 112, for which one may select an incandescent lamp, a light emitting diode (LED), a metal or halogen high intensity discharge (HID) lamp, a fluorescent lamp, or some other source suitable to the application.

In a preferred embodiment, the illumination assembly 110 has a reflector 150 positioned behind and/or around the light source 112, that is, in the direction away from the light-directing assembly 120. The reflector 150 redirects light rays propagating away from the light-directing assembly 120 back towards the microprisms 122. The reflector 150 may be fabricated from a diffuse or a highly specular material such as polished aluminum or white paint, although in some applications a specular material may be preferable. The material selected for the reflector should have a reflectivity in a range of about 75%–90%, and preferably greater than 90%. The reflectivity may be measured with several commercially available instruments such as the Macbeth #7100 Spectrophotometer, New Windsor, N.Y,. or a Perkin Elmer #330 Spectrophotometer, Danbury, Conn.

The location of the reflector with respect to the light source and the light-directing assembly, and the distances therebetween, should be selected to maximize the light directed to the light-directing assembly. As will readily occur to one skilled in the art, the locations and distances can be determined from the relative sizes of the light source and the reflector, and the design of the reflector. Depending on the physical dimensions of the light source, the distance between the light source and the reflector is typically one-to-two times the diameter of the light source. The distance between the light source and the light-directing assembly is also typically one-to-two times the diameter of the light source. For example, if the a T-5 fluorescent lamp is employed as the light source, with a diameter of ⅝", the distance between the lamp and the reflector, as well as the distance between the lamp and the light-directing assembly, typically will range from 0.625" to 1.375".

Figure 3:
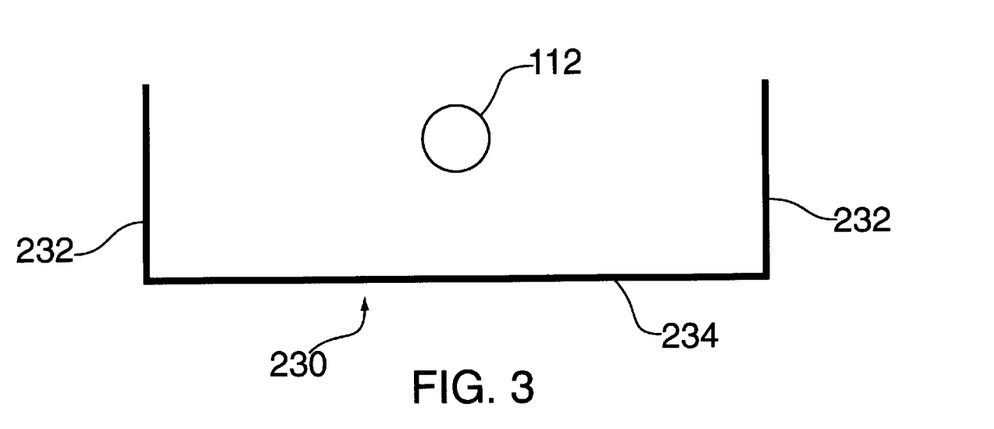
FIGS. 3–5 are schematic cross-sectional diagrams of alternative reflectors for a light source.
Figure 4:
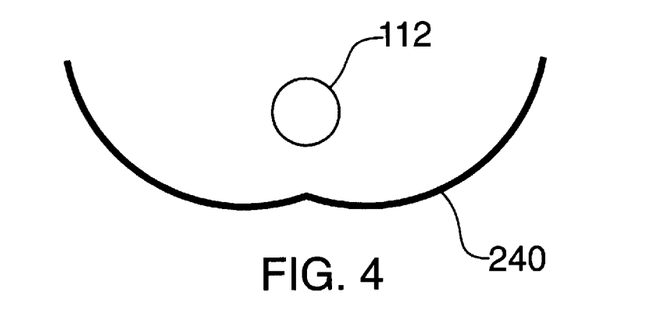
Figure 5:
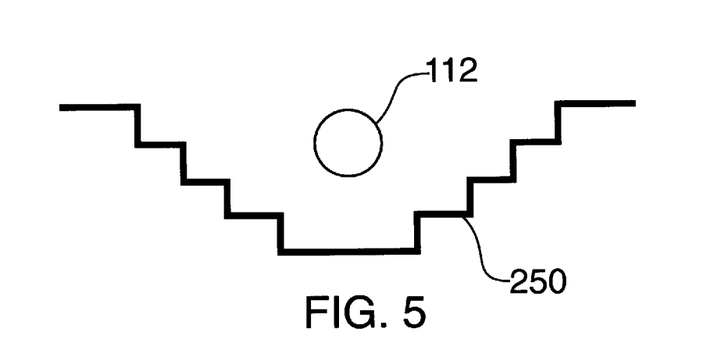

Although the reflector 150 of FIG. 2 has a parabolic shape, other shapes and configurations may be utilized, as will readily occur to one skilled in the art. For example, as illustrated in FIG. 3, the reflector 230 is rectilinear in shape and has two sidewalls 232 and a base 234. To accommodate the geometry and dispersion pattern of the light source 112, the angle of the sidewalls 232 with respect to the base 234 may be adjusted to define a right, acute, or obtuse angle. Other reflector shapes may also be employed, such as a cusp-shaped reflector 240 or a faceted or segmented reflector 250 as shown in FIGS. 4 and 5, respectively. Additionally, instead of a continuous piece of material, the reflector 150 could be implemented in two or more sections.

Instead of an artificial light source of the kind noted above, natural (e.g., direct sunlight) or ambient light could be utilized. In that case, the illumination assembly 110 would not have a reflector.

The Light-Directing Assembly

Figure 6:
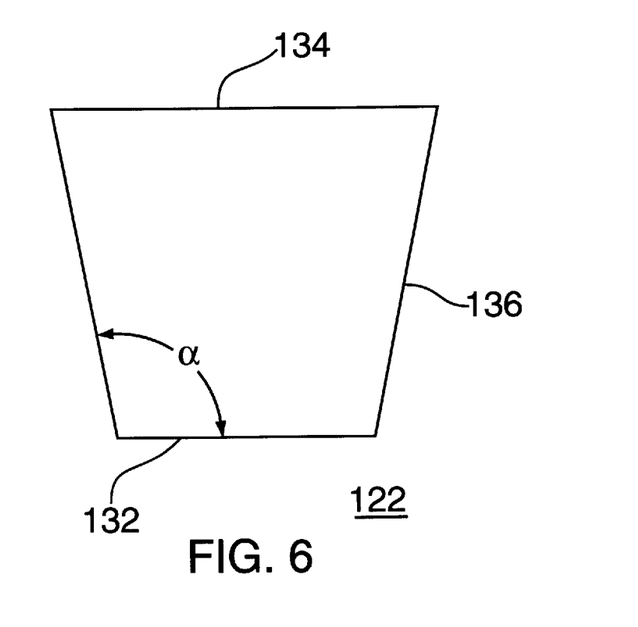
FIG. 6 is a cross-sectional diagram of a microprism of the light-directing assembly of FIG. 2.
Figure 7:
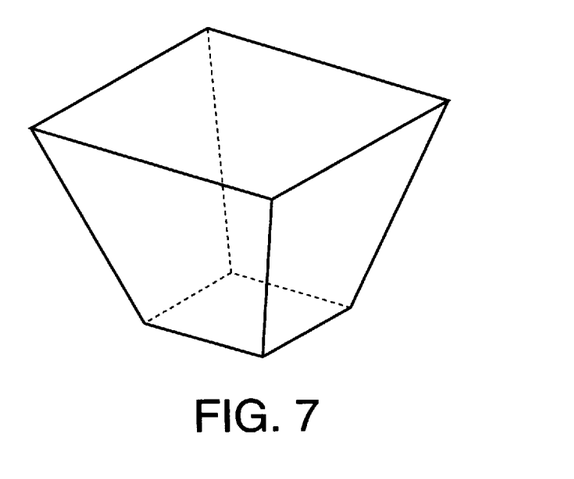
FIGS. 7–12 are perspective views of alternative microprism structures.
Figure 8:
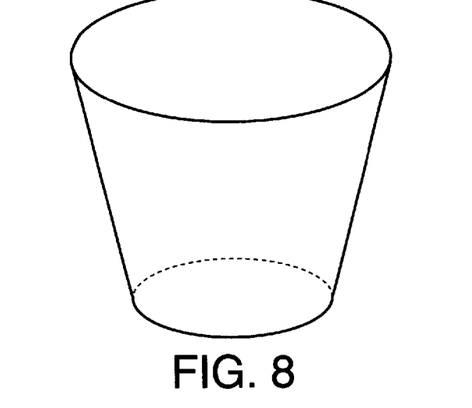
Figure 9:
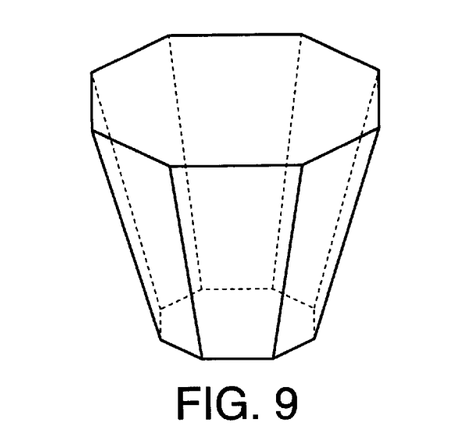
Figure 10:
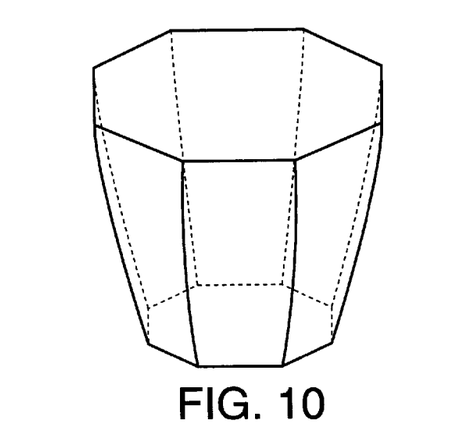
Figure 11:
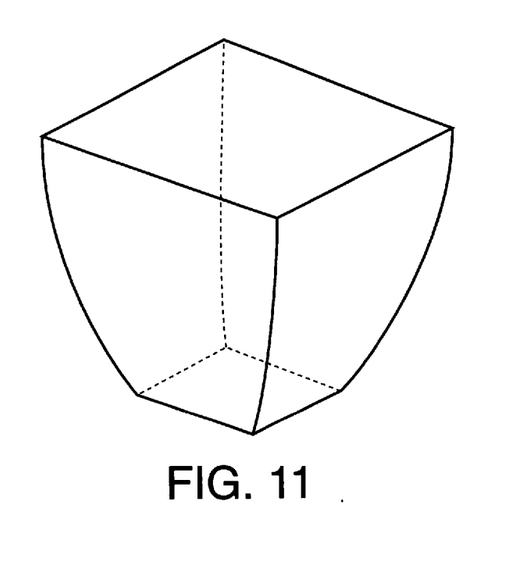
Figure 12:
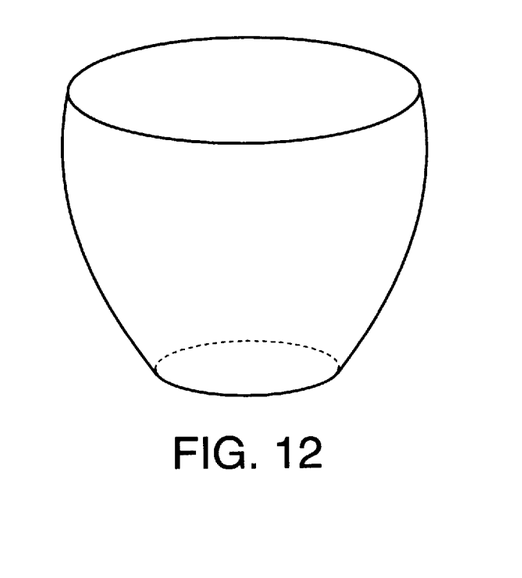
Figure 13:
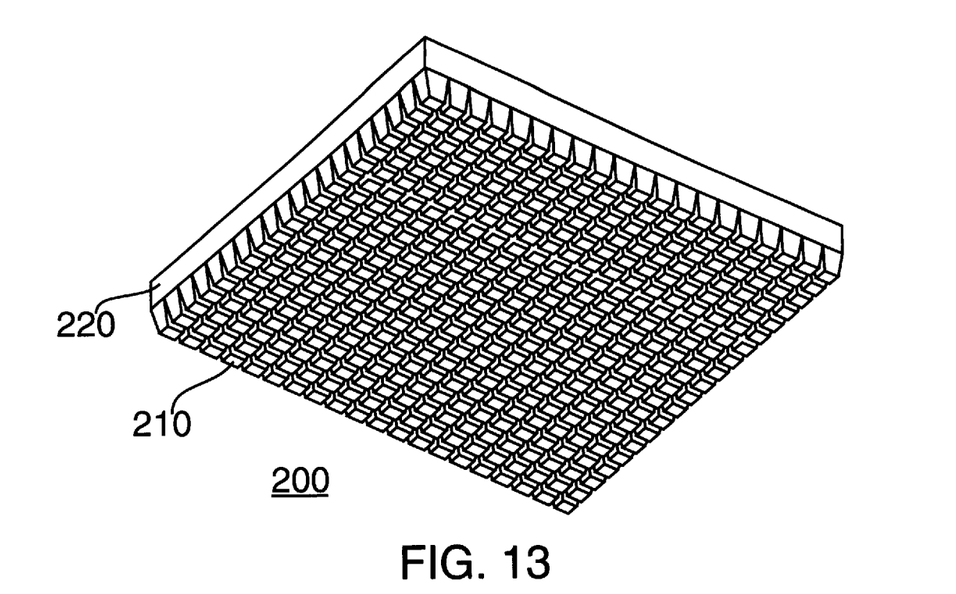
FIG. 13 is a perspective view of an array of rectilinear microprisms.

The microprisms 122 shown in FIG. 2 are polyhedra having four angled sides. The structure of these particular microprisms are discussed in detail in U.S. Pat. No. 5,396,350, issued Mar. 7, 1995, to Beeson et al., for a Backlighting Apparatus Employing an Array of Microprisms, incorporated herein by reference. As shown in FIGS. 6 and 7, each microprism 122 has an input surface 132, output surface 134, and opposing sidewalls 136 each contiguous with the input and output surfaces 132 and 134; the junction of the sidewalls 136 and the input surface 132 define an obtuse tilt angle α. FIG. 13 shows an array 200 of rectilinear microprisms 210 supported on a base wall 220.

Instead of the geometric shape of the microprism 122 of FIG. 6, other shapes may be employed. FIGS. 8–12 illustrate alternative microprisms: conical (FIG. 8), polyhedronal (FIG. 9), polyhedronal curvilinear (FIGS. 10 and 11), and curvilinear (FIG. 12) microprisms. The foregoing list is illustrative only; other geometrical shapes could be used, as will readily occur to one skilled in the art. Further, the cross-sections of the microprisms 122 could be asymmetrical (e.g., rectangular).

The dimensions of the microprisms 122 affect the light output distribution of the light-directing assembly 120. Specifically, the area of the input surface 132, the height of the sidewall surfaces 136, and the tilt angle α of the sidewalls 136 may be adjusted with respect to each other to alter the passage of light through the microprisms 122. A narrower output angular distribution can be achieved by reducing the surface area of the input surface 132, while increasing the height of the sidewalls 136 and minimizing the obtuse tilt angles α. Alternatively, the output angular distribution can be increased by increasing the surface area of the input surface 132, along with reducing the height of the sidewall 136 and increasing the size of the obtuse tilt angles α.

Where a base wall 124 is employed, additional control of the angular dispersion of the output of the illumination system 100 can be achieved by varying the thickness of the wall 124. For a given positive radius of curvature of the lens 142, an increase in the thickness of the base wall 124, increasing the separation between the microprisms 122 and the lens array 140, will result in an increase in the angular distribution of the output of the illumination system 100.

Although the lenses 142 depicted in FIG. 2 are convex, they also could be spherically concave, aspheric, cylindrically concave, cylindrically convex, or of some other suitable shape as dictated by the particular application and as will readily occur to one skilled in the art. Also, the lenses 142 could be located directly on the output surfaces 134 in the event there is no base wall 124. Further, the lenses could be either diffractive or refractive, or a combination of both diffractive and refractive elements.

Figure 14:
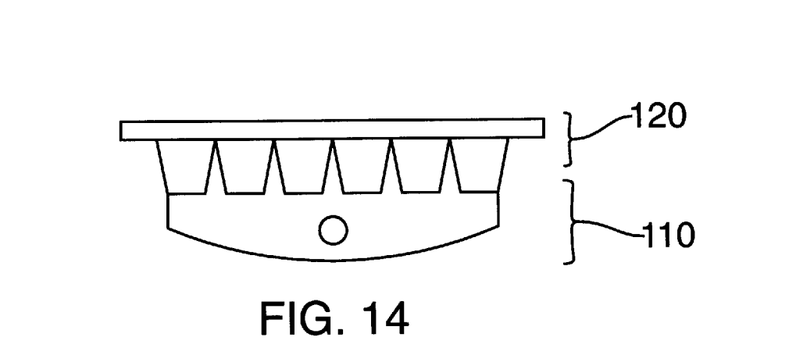
FIG. 14 is a schematic cross-sectional diagram of an embodiment of the back-coupled illumination system without lenses.
Figure 15:
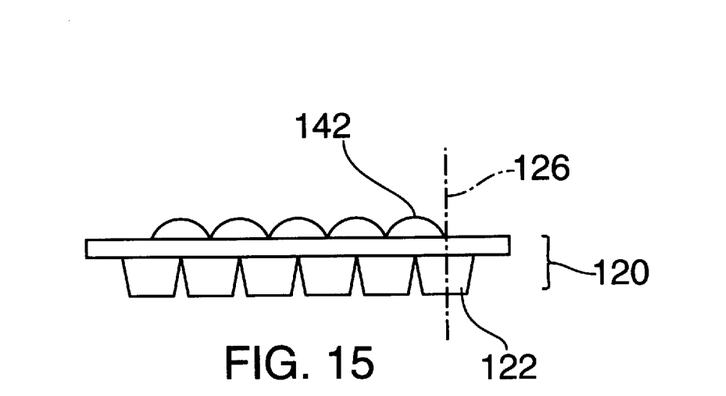
FIG. 15 is a schematic cross-sectional diagram of an array of microprisms and lenses offset with respect to the geometric centers of the microprisms.

It should be understood that the illumination assembly 110 and the light-directing assembly 120 of the back-coupled illumination system 100 could be utilized without lenses, as shown by the structure in FIG. 14. Further, the axes of the lenses 142 in FIG. 2 are aligned with the geometric centers 126 of the individual microprisms 122. If desired, the lenses 142 could be offset or eclipsed with respect to the geometric centers 126 of the microprisms 122, as shown in FIG. 15. Finally, the cross-sectional size of the lenses 142 could vary with respect to the cross-section of the microprisms 122.

The distance between the geometric centers 126 of the individual microprisms 122 and the geometric centers of the lenses 142 varies from zero to one-half of the width of the output surfaces 134 of the microprisms 122. The lenses 142 may be positioned adjacent to the output surfaces 134 of the microprisms 122 or at a distance of up to one-half the distance between the input and output surfaces 132 and 134 of the microprims 122.

The microprisms 122 and associated structure (including the optional lens array) may be fabricated according to the methods and using the materials disclosed in U.S. Pat. No. 5,396,350 previously-mentioned, U.S. Pat. No. 5,428,468, issued Jun. 27, 1995, to Zimmerman et al., for an Illumination System Employing an Array of Microprisms, and U.S. Pat. No. 5,481,385, issued Jan. 2, 1996, to Zimmerman et al., for a Direct View Display with Array of Tapered Waveguide, all of which are incorporated herein by reference. As disclosed in the referenced patents, the microprisms and lens arrays may be made from a wide variety of materials, including polycarbonate, acrylic, polystyrene, glass, transparent ceramics, and a monomer mixture as described in U.S. Pat. No. 5,462,700, Oct. 31, 1995, to Beeson et al., for a Process for Making an Array of Tapered Photopolymerized Waveguides, incorporated herein by reference. The heat generated by the light source should be considered when choosing a material of construction for these structures. If desired, the lens assembly could be provided as a separate sheet laminated to the base wall of the light-directing assembly or fabricated with the light-directing assembly as a unitary structure using injection molding or other techniques that will readily occur to those skilled in the art.

The Regions Adjacent the Sidewalls

The sidewalls 136 of the microprisms 122 of the light-directing assembly 120 define regions 128 adjacent the sidewalls 136; in a light-directing assembly 120 with multiple microprisms 122, these regions may be referred to as "interstitial" regions. These regions 128 are provided with a reflective element which, in the configuration of FIG. 2, is a highly-reflective solid filler 160. The solid filler 160 may reflect or merely block the passage of light. The solid filler 160 may be either specular or diffuse and may include materials such as $BaSO_4$, $TiO_2$, or MgO, which are highly reflective to visible light due to their microstructure. These materials may be utilized in carriers such as dry powder, paint, or putty. Alternatively, materials stable to the environmental conditions posed by the lighting fixture, such as Spectralon™ (Labsphere, Inc.), or Teflon® (du Pont) may be fitted into this region to provide high reflection for visible light. Although the solid filler 160 is preferably highly reflective, i.e., greater than ninety percent (90%) reflectivity, there may be applications where a less-highly reflective material or an absorptive material would be desirable. The reflectivity can be measured as previously indicated.

Figure 16:
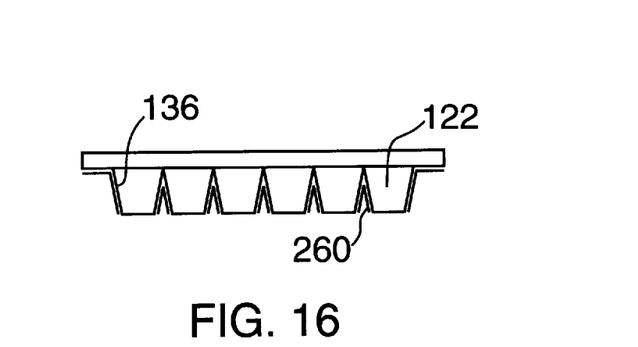
FIGS. 16–23 are schematic cross-sectional diagrams of light-directing assemblies with various alternative reflective elements.

Other reflective materials may be used as the reflective element. In FIG. 16, the sidewalls 136 of the microprisms 122 have a coating 260 of reflective material. The coating 260 may be silver, aluminum, gold, white enamel, or other materials that will readily occur to one skilled in the art.

Figure 17:
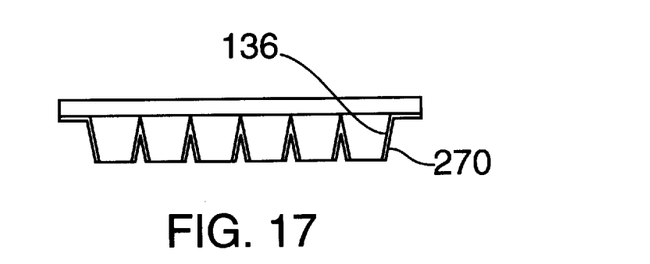
Figure 18:
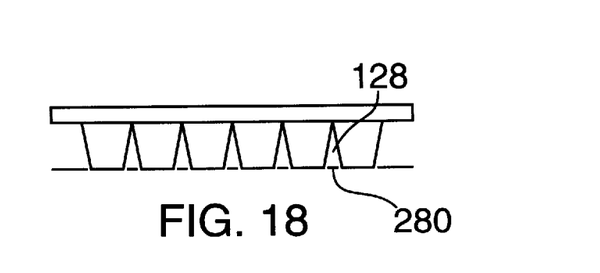
Figure 24:
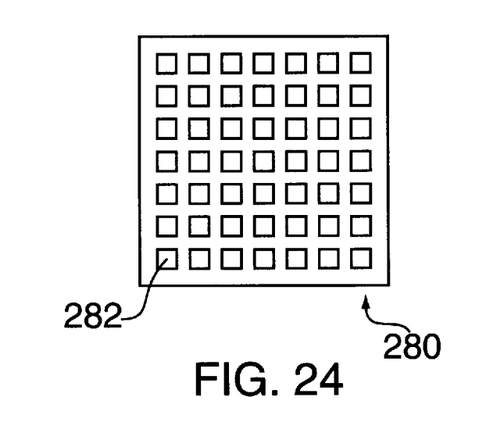
FIG. 24 is a top view of a mask used in the illumination system of FIG. 18.

These materials may be deposited by such techniques as chemical vapor deposition, electron beam vapor deposition, sputtering, and the like. In FIG. 17, the reflective element is a reflective lining 270 integrally molded with the sidewalls 136 or applied by adhesive or some other known means to the sidewalls 136. In FIG. 18, a mask 280 is employed as the reflective element and covers the regions 128 between the microprisms 122. As illustrated in FIG. 24, a top view of the mask 280 would appear as a lattice with openings 282 that admit the input surfaces 132 of the microprisms 122. The mask could be made of solid materials which are either specular or diffuse as mentioned previously.

The reflective elements of FIGS. 16–18 (coating, lining, and mask) may be either specular or diffuse, with a reflectivity in the range of about 75%–90%, and preferably greater than 90%. One example of a suitable specular material is Silverlux™, a product of 3M but others may be employed, as will readily occur to one skilled in the art. The reflectivity can be measured as previously indicated.

Figure 19:
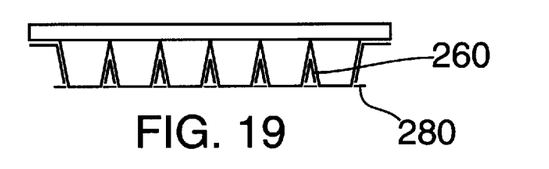
Figure 20:
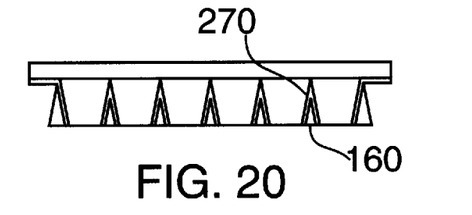

Different types of reflective elements may be used in combination. As shown in FIG. 19, the sidewalls 136 have two reflective elements: a coating 260 and a mask 280. A reflective lining 270 and solid filler 160 are provided in the regions 128 of the assembly shown in FIG. 20. In this configuration, one could select a specular material for the lining 270 and a diffuse material for the filler 160, although other combinations may be employed.

Figure 21:
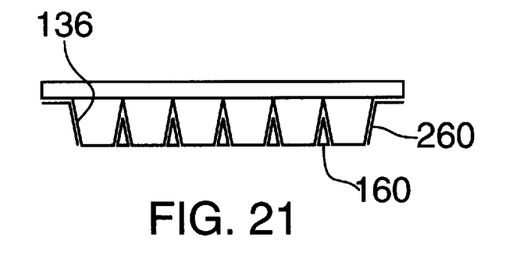
Figure 22:
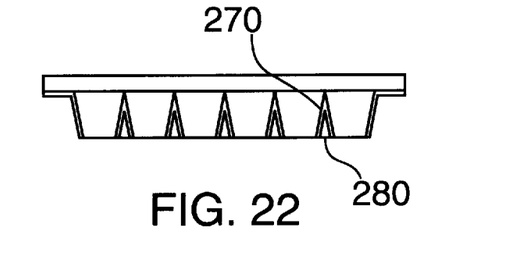
Figure 23:
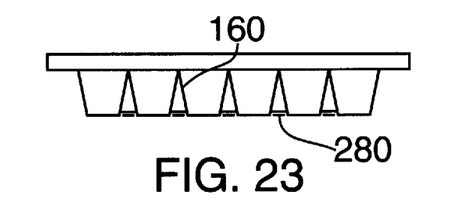

In FIG. 21, the sidewalls 136 have a coating 260 and a solid filler 160. A reflective lining 270 and a mask 280 are provided in the regions 128 of the assembly shown in FIG. 22. Finally, the combination of a solid filler 160 and a mask 280 are provided in the regions 128 in FIG. 23.

Figure 25:
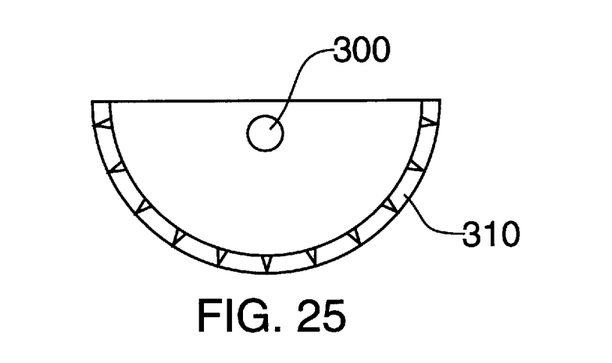
FIGS. 25–28 are perspective views of alternative illumination systems.
Figure 26:
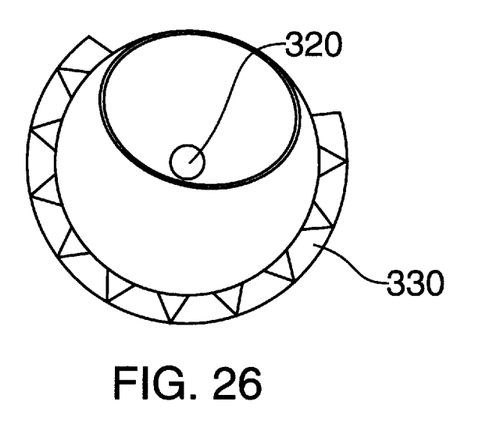
Figure 27:
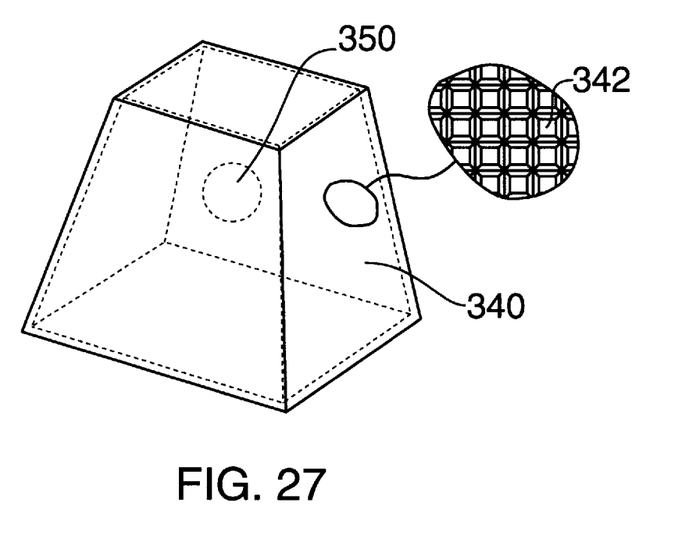
Figure 28:
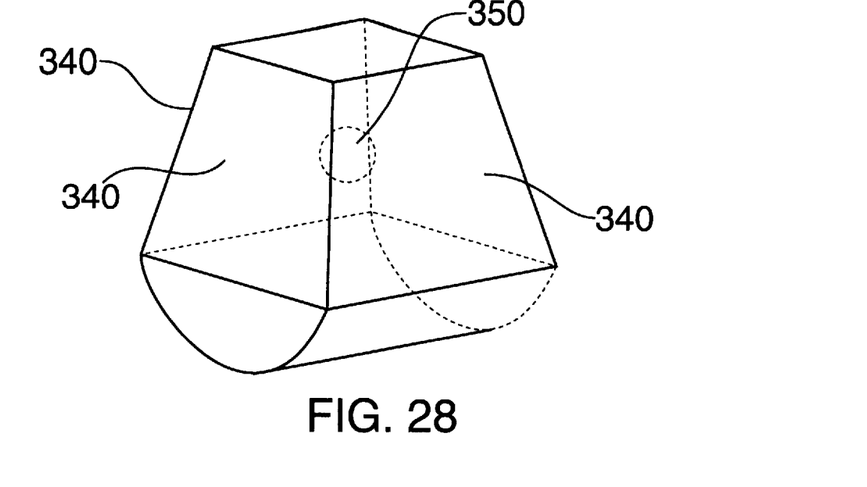

The arrangements discussed until this point have been linear or planar. The illumination system could also be configured as curvilinear or spherical arrays, as shown in FIGS. 25 and 26, respectively, and other configurations as will readily occur to one skilled in the art. In FIG. 25, a light source 300 faces a curvilinear array 310 of microprisms. In FIG. 26, a light source 320 is contained within a partial spherical array 330 of microprisms. To configure the light-directing assemblies in this fashion, the tilt angles of the microprism sidewalls with respect to the input surfaces need to be adjusted to provide an angular distribution appropriate to a spherical radiator. In addition, the space between the microprisms may need to be varied to achieve proper control of the light. The input and output surfaces of the microprisms may be flat, curvilinear, or spherical. Also, the light-directing assemblies of FIGS. 25 and 26 may be provided with optional basewalls adjacent the output surfaces of the microprisms and optional lenses on the basewalls, in the manner taught in FIG. 2. Additionally, multiple planar and/or curvilinear light-directing assemblies 340 and one or more light sources 350 could be combined to form polyhedronal illumination systems as illustrated in FIGS. 27 and 28 to provide multi-directional radiation. The individual microprisms of one planar assembly are illustrated in the magnified section 342 in FIG. 27.

Figure 29:
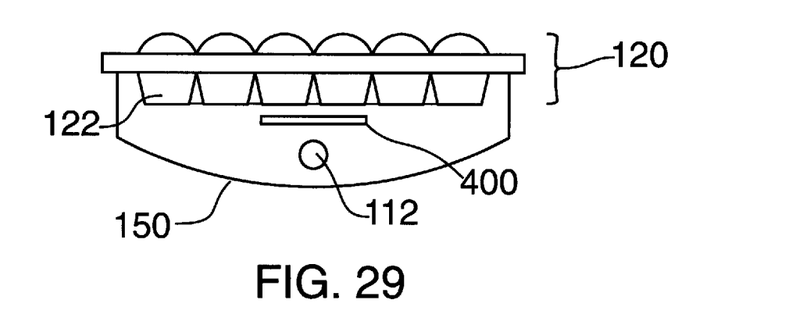
FIGS. 29–32 are schematic cross-sectional diagrams of additional alternative illumination systems.

The intensity of the light entering the light-directing assembly 120 can be controlled by introducing an optical element 400 between the light source 112 and the light-directing assembly 120, as shown in FIG. 29. By reducing the direct transmission of light from the light source 112 into the microprisms 122, the output of the light-directing assembly 120 is more uniform and glare is minimized. The optical element 400 may be fabricated from a rectangular piece of material (e.g., plastic, glass, or some other material) having planar dimensions approximately the same as the cross-section, at that location, of the light travelling from the light source 112 to the microprisms 122. The material may be diffuse or partially specular.

Figure 30:
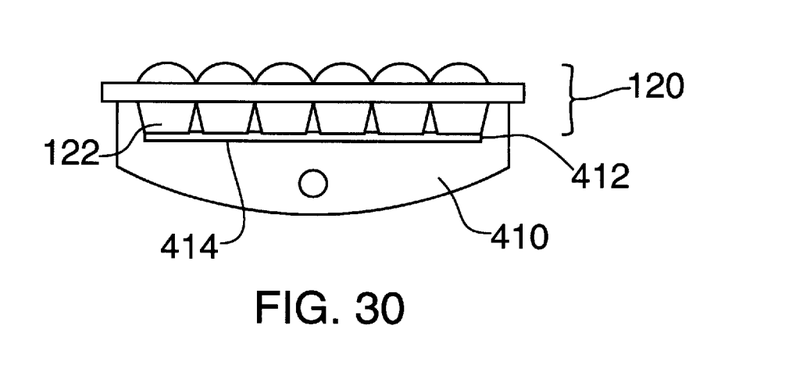

The illumination assembly 110 may be further modified as illustrated in FIG. 30 by encapsulating the light source 112 with an optically-transmissive material 410 having an index of refraction ($n_1$) greater than one, instead of simply leaving the light source 112 suspended in air. The optically-transmissive material 410 may fill the area surrounding the light source 112 and is contiguous with the input surfaces 132 of the microprisms 122. This will avoid Fresnel reflections at the input surfaces 132 of the microprisms 122 and allow the light source 112 to more easily fill an array of input surfaces 132 considerably larger than the source 112. The optically-transmissive material 410 is joined to the input surfaces by an adhesive layer 412. For optimum transfer of light, the indices of refraction are chosen such that they increase as one progresses outward from the light source 112. Thus, where the values of the indices of refraction of the optically-transmissive material 410 ($n_1$), the adhesive layer 412 ($n_2$), and the light directing assembly 120 ($n_3$) are chosen such that:

$$n_1 \leq n_2 \leq n_3.$$

An optical element 414 similar in function to that of element 400 in FIG. 29 could be placed on the adhesive layer 412. The index of refraction of the element 414 should be approximately equal to $n_2$.

Figure 31:
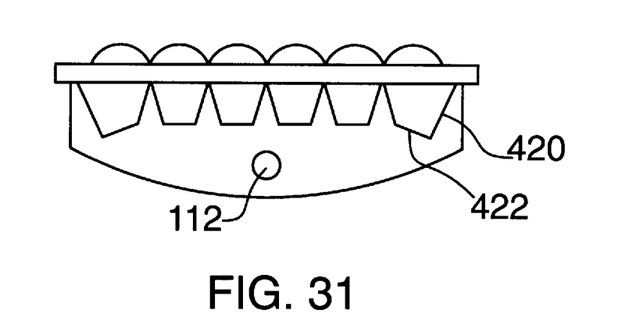

Transmission of light from the source 112 to the input surfaces 132 may also be enhanced by introducing a curvature in the microprisms complementing the radiation pattern of the light source 112. As shown in FIG. 31, the input surfaces 422 of the microprisms 420 define an arc to insure that the angle of incidence is less than the attenuating angle at the microprisms 420 furthest from the light source 112. The attenuating angle is defined by the following equations:

$$R_S = \frac{\sin^2(\Phi_i - \Phi')}{\sin^2(\Phi_i + \Phi')}$$

$$R_P = \frac{\tan^2(\Phi_i - \Phi')}{\tan^2(\Phi_i + \Phi')}$$

where:

$n_1 \sin \phi_i = n_3 \sin \phi'$ and $R_s$ is the reflectivity of light polarized perpendicular to the plane of incidence;

$R_p$ is the reflectivity of light polarized parallel to the plane of incidence;

$\phi_i$ is the angle of the light ray incident on the input surface 422;

$\phi'$ is the angle of the light ray incident transmitted through microprism 420; and $\phi_i$ and $\phi'$ are defined from the normal to the plane of the input surface 422.

Figure 32:
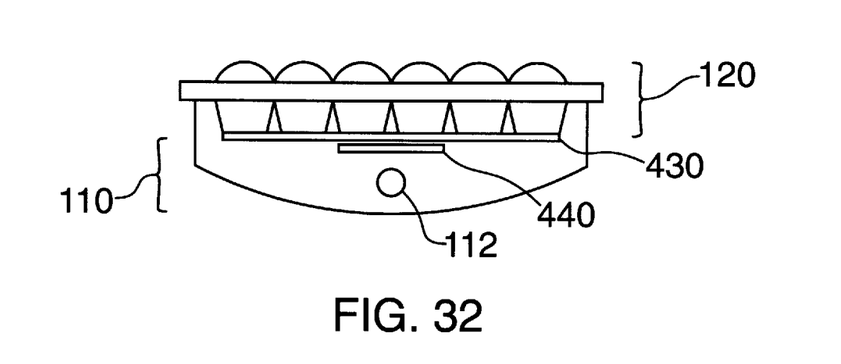

In FIG. 32, an intermediate optical element 430 is introduced to restrict the angular distribution of the light entering the light-directing assembly 120. Although it is shown in the drawing as being located between the illumination assembly 110 and the light-directing assembly 120, the element 430 could be positioned within the illumination assembly in closer proximity to the light source 112. Moreover, a second optical element 440, similar to the optical element 400 of FIG. 29, could be provided between the light source 112 and the intermediate optical element 430 to reduce the light output of the illumination assembly 110. The optical elements 430 and 440 may be fabricated from plastic, glass, or some other material.

The index of refraction of the intermediate optical element 430 ($n_3$) can be chosen to selectively attenuate the higher angle-of-incidence light rays from the light source 112 and decrease the angular distribution into the light-directing assembly 120. For example, using the equations on the preceding page for calculating $R_s$ and $R_p$, the increase in reflectivity at an incidence angle $\phi_i$ as the index of refraction $n_3$ is increased. Assuming $n_1$ is equal to 1, then for values of the index of refraction $n_3$ of 1.52, 1.7, and 4.0, the reflectivity at an incidence angle of 45° will be 17.5%, 24%, and 65%, respectively.

Operation of the Illumination System

Figure 33:
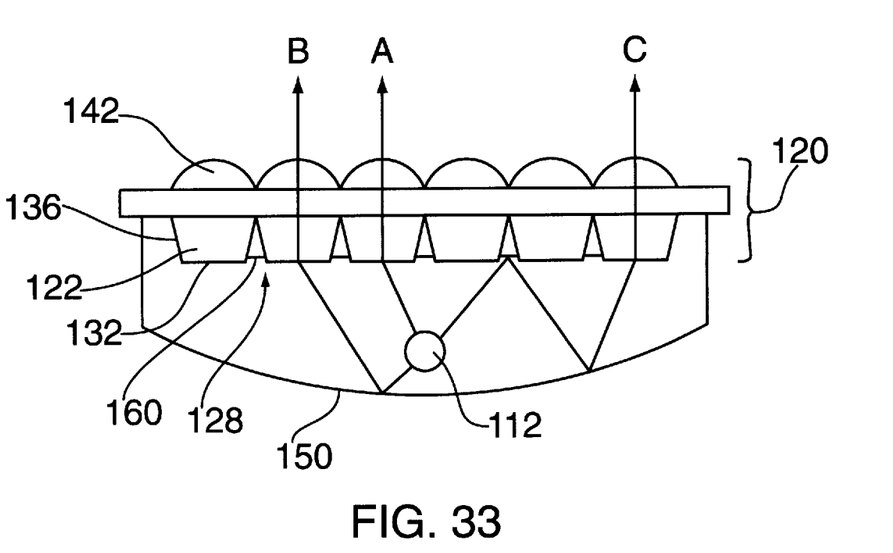
FIG. 33 is a schematic cross-sectional diagram of an illumination system.

The operation of the system will be explained with reference to FIG. 33. Absent a special structure, the light source 112 radiates light towards the light-directing assembly 120 and in other directions as well. Those light rays which travel directly to an input surface 132 of a microprism 122 and are reflected as dictated by the equations for calculating $R_s$ and $R_p$; the remainder of the light is transmitted through the microprism 122 and ultimately pass through an associated lens 142 and out, as represented by light ray A.

If the light leaving the light source 112 initially travels away from the light-directing assembly 120, it will encounter the reflector 150. There, it will be reflected back towards the light-directing assembly 120, passing through a microprism 122 and a lens 142, as depicted by light ray B.

Some of the light rays may travel from the light source 112 towards the light-directing assembly 120 but will enter the regions 128 adjacent the sidewalls 136. If such light rays were allowed to continue on that path, they would likely enter the microprisms 122 through the sidewalls 136. However, they would not properly pass out of the light-directing assembly 120 and in fact would distort the light output distribution. Thus, reflective elements are provided in the regions 128 to block and redirect such errant light rays. As shown, a light ray leaving the source 112 reaches the solid filler 160 where it is reflected back to the reflector 150. There, the light ray is reflected back towards and through the light-directing assembly 120, as represented by light ray C. If a non-reflective filler were used in the regions 128 instead of a reflective material, the light ray would simply be absorbed by the filler. Alternatively, the light could be reflected back towards the light source 112, although this is undesirable as most such light will be absorbed by the light source 112. Therefore this mode of reflection should be minimized, for example, by using a smaller light source.

Figure 34:
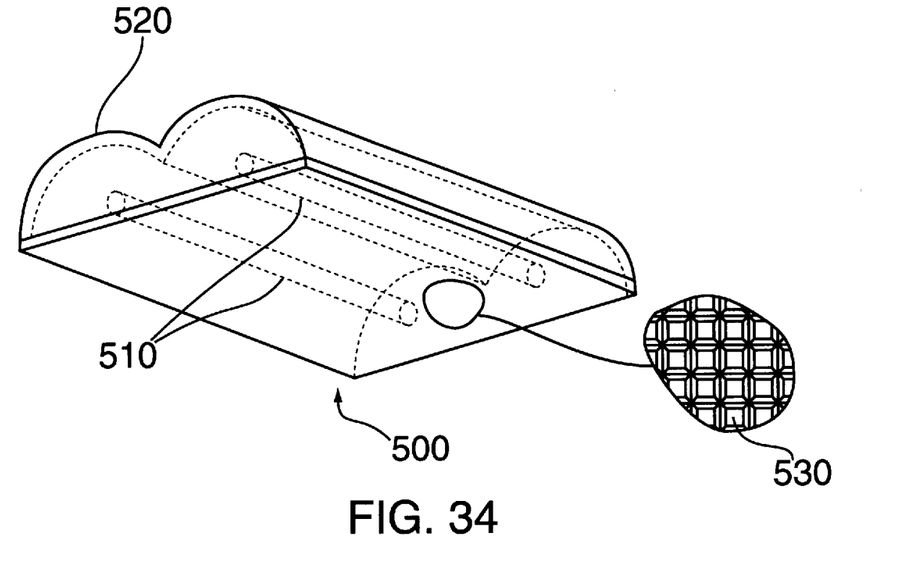
FIGS. 34 and 35 are examples of a commercial troffer and a downlight incorporating the illumination systems described here.
Figure 35:
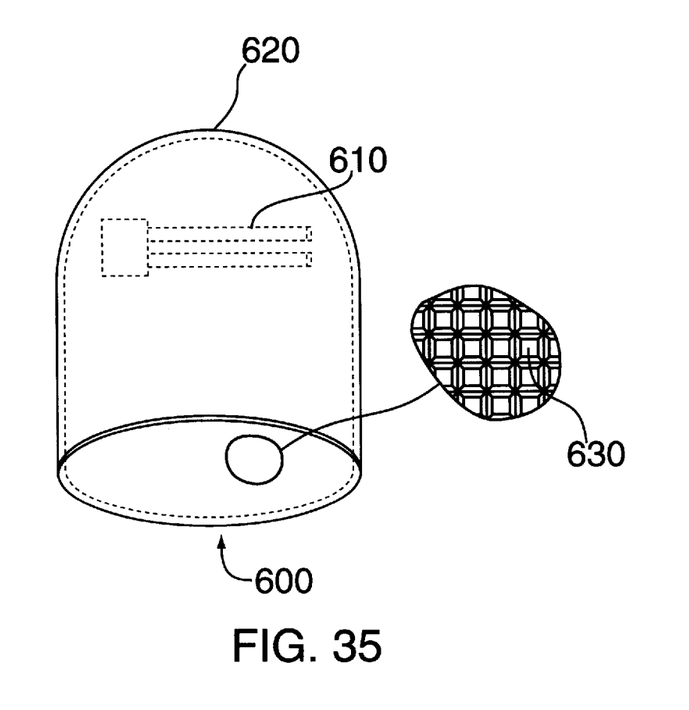

It should be understood that this invention is applicable to a wide variety of devices such as direct illumination devices including lighting for commercial, office, residential, outdoor, automotive, and appliance applications. The invention may also be applied to displays for computer, automotive, military, aerospace, consumer, commercial, and industrial applications, and any other device requiring a source of illumination. Two examples are the commercial troffer 500 and the downlight 600 illustrated in FIGS. 34 and 35, respectively. The troffer 500 has two light sources 510, such as T-5 or T-8 fluorescent lamps, a reflector 520, and a light-directing assembly 530 of microprisms. The downlight 600 similarly has a light source 610 (e.g., a CFL lamp), a reflector 620, and a light-directing assembly 630.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, it should be understood that other variations and combinations are possible using the structures disclosed in the referenced patents.

What is claimed is:

1. An illumination system comprising:
   (a) a light source:
   (b) a reflector located in close proximity to the light source:
   (c) a light-directing assembly in close proximity to the light source and comprising a plurality of microprisms, each microprism comprising an input surface that admits light radiating from the light source, an output surface distal from and parallel to the input surface, and at least one sidewall disposed between and contiguous with the input and output surfaces and forming an obtuse tilt angle with respect to the input surface and further positioned for effecting total reflection of the light rays received by the input surface, the sidewalls of the microprisms defining interstitial regions between the microprisms;
   (d) at least one blocking means positioned to block the passage of light through the sidewalls; and
   (e) an optical means, located between the light source and the light-directing assembly, for reducing the transmission of light from the light source to the light-directing assembly.

2. An illumination system as set forth in claim 1, wherein the optical means is an optical element fabricated from diffuse or partially reflective material or a combination of diffuse or partially reflective materials.

3. An illumination system as set forth in claim 1, wherein the light source is encapsulated in an optically-transmissive material having an index of refraction greater than one and the material is contiguous with the input surfaces of the microprisms.

4. An illumination system as set forth in claim 1, wherein the illumination assembly further comprises intermediate optical means, located between the light source and the light-directing assembly, for restricting the angular distribution of the light transmitted to the light-directing assembly.

5. An illumination system as set forth in claim 4, wherein the indices of refraction of the light-directing assembly and the intermediate optical means are selected such that their ratio is increased with respect to the index of refraction of the medium surrounding the light source.

6. An illumination system as set forth in claim 5, wherein the illumination assembly further comprises a light-reducing optical means, located between the light source and the intermediate optical means.

7. An illumination system as set forth in claim 1, wherein the input surfaces of the microprisms define an arc complementary with respect to the angular distribution of the radiation of light from the light source.

8. An illumination system, comprising:
   (a) a light source;
   (b) a parabolic reflector positioned about the light source and oriented to direct reflected light towards the input surfaces of the microprisms;
   (c) a light-directing assembly in close proximity to the light source and comprising a plurality of microprisms, each microprism comprising an input surface that admits light radiating from the light source, an output surface distal from and parallel to the input surface, and at least one sidewall disposed between and contiguous with the input and output surfaces and forming an obtuse tilt angle with respect to the input surface and further positioned for effecting total reflection of the light rays received by the input surface, the sidewalls of the microprisms defining interstitial regions between the microprisms; a base wall having two surfaces, where the output surfaces of the microprisms adjoin one surface of the base wall;

(d) at least one blocking means for blocking the passage of light through the sidewalls, wherein the blocking means is selected from the group comprising a reflective coating on the sidewalls, a reflective lining on the sidewalls, a solid filler material in the interstitial regions, a reflective mask adjacent the input surfaces of the microprisms, and combinations thereof; and (e) a lens assembly comprising a plurality of lenses, wherein the lens assembly adjoins the other surface of the base wall.

* * * * *